United States Patent [19]
Bass

[11] 3,719,559
[45] March 6, 1973

[54] FUEL PIN SPACER STRUCTURE
[75] Inventor: John C. Bass, La Jolla, Calif.
[73] Assignee: Gulf General Atomic Incorporated, San Diego, Calif.
[22] Filed: Sept. 26, 1969
[21] Appl. No.: 861,336

[52] U.S. Cl.........................176/78, 176/76
[51] Int. Cl. ..............................G21c 3/34
[58] Field of Search.............176/76, 78, 87, 73

[56] References Cited

UNITED STATES PATENTS

| | | | |
|---|---|---|---|
| 3,137,638 | 6/1964 | Kumpf et al.......................176/78 |
| 3,228,854 | 1/1966 | Bekkering et al.................176/78 |
| 3,255,091 | 6/1966 | Frisch...............................176/78 |
| 3,314,860 | 4/1967 | Wilman.............................176/78 |
| 3,398,053 | 8/1968 | Huber et al.......................176/78 |
| 3,423,287 | 1/1969 | Anthony et al...................176/78 |
| 3,431,171 | 3/1969 | Glandin............................176/78 |

Primary Examiner—Carl D. Quarforth
Assistant Examiner—Gary G. Solyst
Attorney—Fitch, Even, Tabin & Luedeka

[57] ABSTRACT

A spacer structure is described for maintaining a spaced relation between a plurality of generally parallel fuel pins in a nuclear reactor. The spacer structure is comprised of a plurality of spacer elements constructed from flat plate stock and bent in a way so that when the separate pieces are assembled together, they support each fuel pin at a plurality of points and interlock and each other to form a grid-like assembly.

6 Claims, 9 Drawing Figures

3,719,559

PATENTED MAR 6 1973

INVENTOR.
JOHN C. BASS

BY
Anderson, Luedeka, Fitch, Even, & Tabin

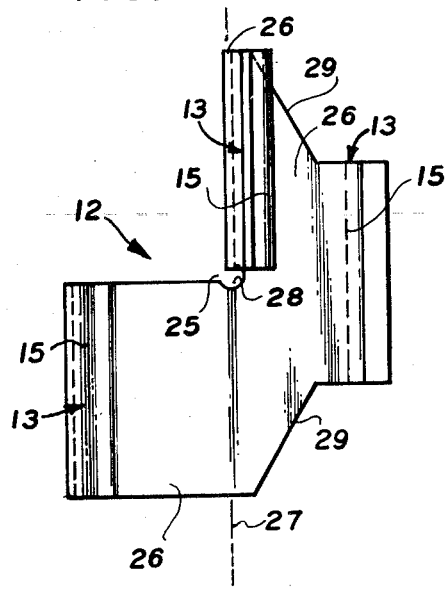
FIG. 4.
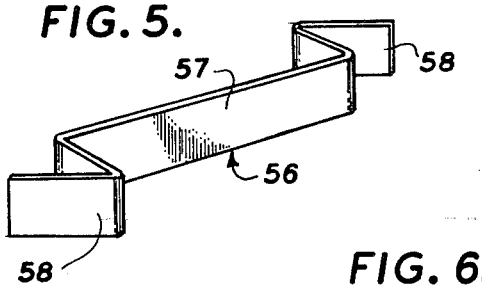
FIG. 5.
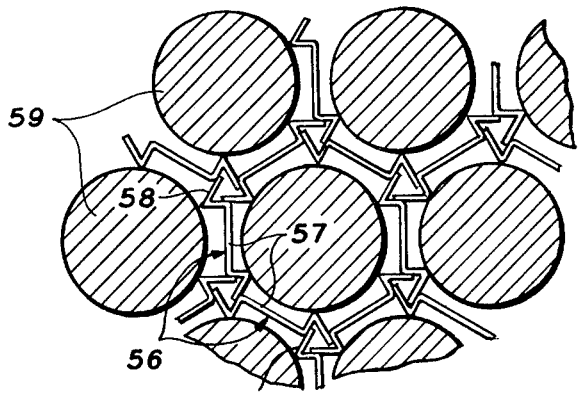
FIG. 6.
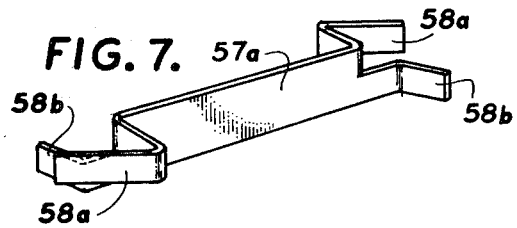
FIG. 7.
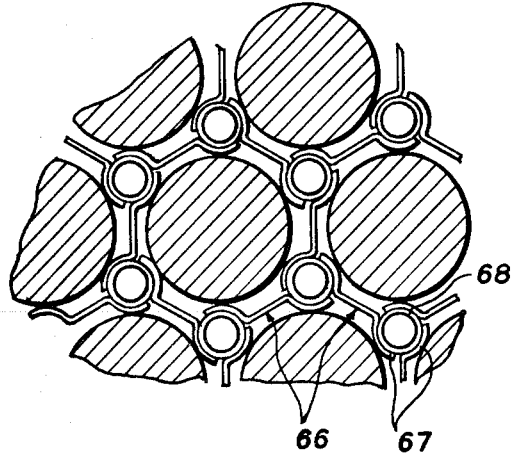
FIG. 8.
FIG. 9.
INVENTOR.
JOHN C. BASS

FUEL PIN SPACER STRUCTURE

This invention relates generally to nuclear reactors and, more particularly, to a spacer structure for maintaining a spaced relation between a plurality of generally parallel fuel pins in a nuclear reactor.

In nuclear reactors of the type which employ elongated fuel rods or pins in the reactive core, provision is typically made for maintaining the relative location and alignment of the fuel pins. Typically, such provision is made by means of a spacer structure comprised of elements integral with or separate from the fuel pins and which form a grid-like structure which engages the outer surfaces of the fuel pins to maintain the desired separation. Such a spacer structure may extend transversely of the entire reactive core, or may extend transversely of a modular core fuel element comprising an outer housing containing a plurality of fuel pins.

In the proper design of a spacer structure for maintaining a spaced relation between fuel pins in a nuclear reactor, a problem arises in connection with so-called "hot-spots" on the cladding of the fuel pins. In order to remove heat from the fuel pins, a fluid coolant is typically circulated along the outer surface of the fuel pins. In the region where a fuel pin is contacted by a spacer structure, however, contact between the outer surface of the fuel pin and the circulating coolant may be prevented, not only in the region of contact, but in a larger region adjacent thereto due to perturbation of the coolant flow by the presence of the spacer structure. Overheating of a fuel pin in the region of a hot spot may cause serious trouble.

Another significant problem in the design of spacer structures for maintaining a spaced relation between fuel pins in a nuclear reactor is that of the coolant pressure drop resulting from the presence of a spacer structure. This problem may become particularly critical in connection with reactors wherein the fluid coolant is a gas, since a substantial pressure drop can have a significant effect on the heat removed. Ideally, a spacer structure should present minimum resistance to coolant flow. This factor is offset, however, by the need for adequate strength in the spacer structure to maintain the desired spaced relationships. Various aerodynamic designs are possible in connection with spacer structures, however, this adds considerable expense to their manufacture.

As a result of the numerous variable factors which enter into the design of a spacer structure, the optimization of spacer design involves a consideration and compromise of the many factors, the relative importance of which may depend upon the particular core design, type of coolant, etc. Some of the more important considerations in the design of a spacer structure, in addition to the hot spot and pressure drop problems discussed above, include: various considerations of mechanical tolerances; the restraint which the structure provides against bowing tendencies of fuel pins as a result of differential thermal expansion; the desirability of restraining flow induced vibrations with associated fretting and wear problems; localized stresses between the spacer structure and the fuel pins; stresses within the spacer structure itself, and; the mass of additional metal introduced into the core by the presence of the spacer structure.

It is an object of the present invention to provide an improved spacer structure for maintaining a spaced relation between a plurality of fuel pins in a nuclear reactor.

Another object of the invention is to provide a spacer structure which presents minimal frontal area to coolant flow to thereby minimize pressure drop.

Another object of the invention is to provide a spacer structure wherein adequate mechanical support for the fuel pins is provided with minimum contact area between the spacer structure and the fuel pins.

It is another object of the invention to provide an improved spacer structure which is of low cost and which is easily manufactured.

Other objects of the invention will become apparent to those skilled in the art from the following discussion, taken in connection with the accompanying drawings wherein:

FIG. 4 is an elevational view illustrating one spacer element employed in the spacer structure of the invention;

FIG. 5 is a perspective view of a spacer element used in an alternative embodiment of the invention;

FIG. 6 is a plan sectional view illustrating an alternative embodiment of the invention employing spacer elements of the type shown in FIG. 5;

FIG. 7 is a perspective view of a modification of the spacer element of FIG. 5;

FIG. 8 is a perspective view of a spacer element used in a further alternative embodiment of the invention; and FIG. 9 is a plan sectional view of a further alternative embodiment of the invention utilizing spacer elements of the type illustrated in FIG. 8.

Figure 1:
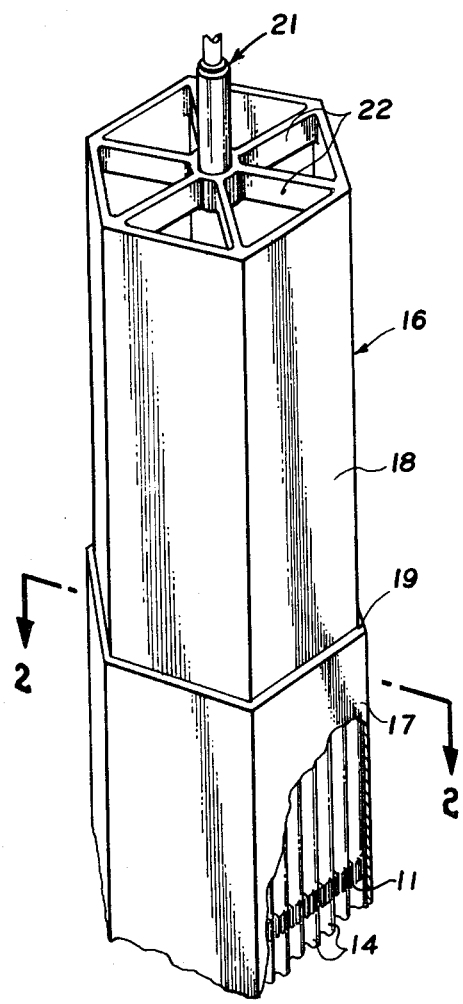
FIG. 1 is a perspective view of a modular fuel element (and a portion of its supporting structure) with a portion of the fuel element housing broken away to illustrate fuel pins and a portion of a spacer structure constructed in accordance with the invention.

Very generally, the spacer structure 11 of the invention includes a plurality of spacer elements 12, each being formed with at least two sections 13 having convex surfaces 15 thereon. Each convex surface protrudes in a direction of a respective adjacent fuel pin 14 for engaging same. The sections of the spacer elements are of a configuration to interlock with the corresponding sections of immediately adjacent spacer elements and are so interlocked in a grid-like assembly. The spacer elements are formed with substantially greater dimension in a direction generally parallel with the axes of the fuel pins than in the direction transverse thereto to present, for a given cross sectional area of the spacer elements, minimal resistance to coolant flow along the fuel pins.

Figure 2:
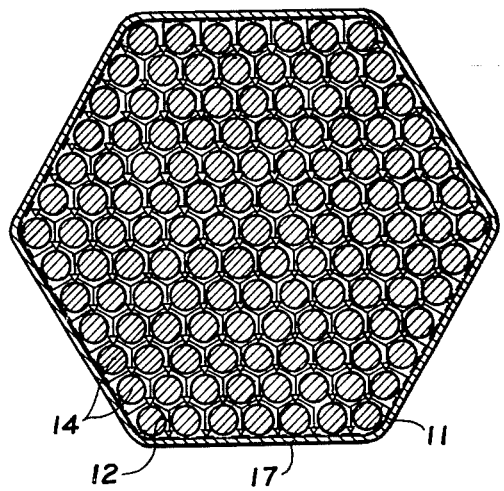
FIG. 2 is an enlarged plan cross sectional view taken along the line 2—2 of FIG. 1.
Figure 3:
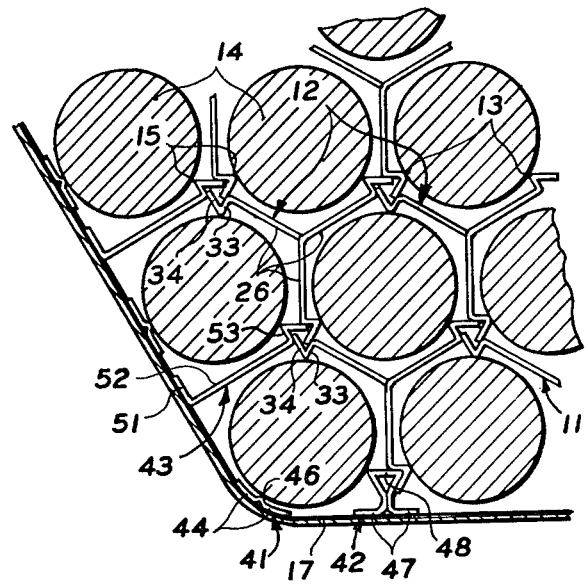
FIG. 3 is an enlarged plan cross sectional view of a portion of the fuel element as shown in FIG. 2.

Referring now particularly to FIG. 1, a modular fuel element 16 is shown. The spacer structure 11 of the invention which will be described in connection with FIGS. 1 to 3 is for use in a modular fuel element of the illustrated type. A plurality of such fuel elements may be positioned adjacent each other to form the reactive core for a nuclear reactor. It is to be understood, however, that the spacer structure of the invention is also applicable in situations other than that illustrated, such as, for example, in situations wherein a core is comprised of a plurality of mutually parallel fuel rods in a non-modular arrangement.

The modular fuel element 16 includes a box-like housing 17 which is shaped to enclose a hexagonal cross section. The upper end of the housing 17 is provided with a section 18 of reduced size forming a shoulder 19 surrounding the periphery of the housing 17. The reduced size section 18 mates in a correspondingly shaped recess in a supporting structure (not shown) such that the fuel element, along with the other similar fuel elements, depends from the supporting structure and is held in proper relative alignment. The fuel element 16 is secured in the supporting structure, not shown, by suitable securing means 21 supported at the top end of the fuel element housing 17 by diagonally extending webs 22. The support means 21 may, for example, be designed to provide a bayonet type attachment to the supporting structure so that the modular fuel element may be readily released and lowered from the supporting structure for replacement.

Inside the housing 17 of the modular fuel element 16, provision is made (not shown) for suspending a plurality of the fuel pins 14 from their upper ends to depend downwardly and extend along the elongated housing 17. The fuel pins 14 may be of any suitable construction, such as a pelletized fissionable material contained within a suitable metallic cladding. The illustrated fuel pins 14 are cylindrical and are arranged as shown in FIG. 2. It may be seen that, within the hexagonal housing 17, the fuel pins are arranged in mutually parallel rows parallel with two of the opposite sides of the hexagon. The rows of fuel pins in the direction perpendicular to such mutually parallel rows are also mutually parallel, but the fuel pins are spaced so that adjacent rows are offset by one-half the diameter of a fuel pin; a generally hexagonal pitch arrangement.

In order to maintain a desired spaced relation between the fuel pins 14, a spacer structure 11 constructed in accordance with the invention is provided at at least one location spaced along the length of the fuel pins from their supported upper ends. The spacer structure 11 is comprised of a plurality of spacer elements 12. Each spacer element is fabricated out of sheet stock in a relatively simple and straightforward procedure. Basically, each spacer element includes three planar strips 26 which extend at 120° angles with respect to each other from a common axis line 27 (see FIG. 4). The axis line 27, when the spacer element is assembled into the spacer structure, extends parallel with the axis of the fuel pins.

The strips 26 on each spacer element are displaced along the line 27 with respect to each other, enabling the spacer element to be formed out of a blank of flat plate or sheet stock. To enable forming, the blank is provided with an elongated slot 25 between the uppermost and lowermost strips 26, and a stress relief hole 28 at the inner terminus of the slot. The uppermost and lowermost strips are then bent with respect to each other out of their common plane in the blank to the relationship illustrated. The blank is provided with a pair of angular cut-outs 29 to produce a taper in the middle one of the strips 26 so that its contact section 13 is of the same height as the other two contact sections on the other two strips.

The contact sections 13 are at the end of each of the three strips 26 in a spacer element 12. In the spacer elements of the embodiments of FIGS. 1 to 3, the convex surfaces 15 which protrude in the direction of respective adjacent fuel pins for engaging same are provided by forming the contact sections 13 to have a pair of oblique planar segments 33 and 34 (FIG. 3). The segment 33 is formed by producing a right-angle bend in the corresponding strip 26, and the segment 34 is formed by producing a further bent section extending from the segment 33 and forming a 60° angle therewith. The convex surface 15 is thus formed between the segments 33 and 34 and is preferably given a slight radius to minimize internal stresses at that point. The oblique planar segments 33 and 34 with the curved section or convex surface 15 therebetween thus constitute a transverse protrusion extending from the plane of the associated strip 26. These protrusions extend toward the most adjacent of the fuel pins 14 to engage same on its outer surface at the convex surface 15 on the spacer element. This is most clearly shown in FIG. 3.

It may be seen from FIG. 2 that the strips 26 and the segments 33 and 34 all lie in planes which extend parallel with the axes of the fuel pins 14. Moreover, the identical nature of the angular relationships enable the contact sections 13 to interlock with the corresponding contact sections of immediately adjacent spacer elements. By interlock, it is meant not necessarily to be mechanically secure, but merely to cooperate with each other in forming a desired configuration, such as a triangle or circle. In the embodiment of FIGS. 1–4, the corresponding contact sections which are interlocked are those sections on strips 26 of common level, and form triangles. Thus, three intersecting contact sections 13 will all be from strips 26 of either upper, middle, or lower levels as viewed in FIG. 4. The material of which the spacer elements are comprised is selected to provide sufficient strength at operating temperatures and under conditions of high radiation. Moreover, the material is selected to be slightly resilient in order that the contact sections 13 may deform slightly when contacting the adjacent fuel pins and thus maintain a bias force against the outer surface of the fuel pins. In the spacer structure 11 illustrated in FIGS. 1 to 4, the spacer elements assembled into the grid-like assembly are secured to each other at their points of contact by suitably brazing or welding them. Alternatively, the ends of the planar segments 34 may be extended so they abut the inside of the corresponding segment 34 on an adjacent spacer element. Thus, clockwise rotation of the spacer element as viewed in FIG. 2 is prevented and brazing or welding may not be necessary if the resilient bias provided by contact with the fuel pins is sufficient. Such an expedient, however, increases the frontal area presented to coolant flow, as will be more thoroughly discussed subsequently, and thus may be undesirable in some circumstances.

In order to effect the transition from the general pattern of the spacer structure to the peripheral shape of the structure as determined by the shape of the fuel element housing 17, transition pieces are provided at the edge of the fuel pin array so that the spacer structure may be attached to the fuel housing. Such transition pieces may be seen in FIG. 3 and are of three types. The various types of transition pieces are exemplified by the transition pieces 41, 42 and 43. The transition piece 41 includes a pair of flat portions 44 which follow the inner contour of the hexagonal wall 17 of the modular fuel element 16. Connecting the two flat pieces 44 is a ridge section 46 which projects inwardly and engages the periphery of the adjacent fuel pin 14.

The transition piece 42 similarly includes a pair of flat plate sections 47. The flat plate sections 47 are supportive of a central projection 48 of triangular cross section. The projection 48 mates on one side with a contact section 13 of an adjacent spacer element 12. The corner of the triangular section 48 other than that which mates with the contact section 13 engages the outer periphery of an adjacent fuel pin 14 for supporting same.

The transition element 43 includes a flat section 51 which fits against the interior surface of the fuel element housing 17 and from which extends, at a right angle, a flat strip 52. The strip 52 terminates in a contact section 53 which is identical with the contact sections 13. The contact section 53 of the transition piece 43 interlocks with other contact sections on spacer elements 12 adjacent thereto and engages the adjacent fuel pin 14.

The flat plates 44, 47 and 51 of the transition elements 41, 42 and 43, respectively, are secured to the inner surface of the fuel element housing 17 by suitable means such as by brazing or welding. Of course other configurations of transition elements are possible, and the various transition elements 41, 42 and 43 may be made integral with each other in various convenient combinations. Moreover, the transition elements 41 and 42 may be replaced with suitably formed indentations in the wall of the fuel element housing 17.

In the design of nuclear reactor cores, wherein the fluid coolant is circulated past the fuel pins or fuel rods, it is desirable to avoid excessive drop in fluid pressure. Such a drop in fluid pressure can result in deleterious performance, particularly where the fluid coolant being circulated is a gas. In order to avoid excessive pressure drop, it is desirable that obstruction to the flow of the fluid coolant be minimized. The spacer structure of the invention is manufactured out of flat plate stock and thereby presents, for a given cross sectional area of the spacer element, minimum frontal area to the coolant. This minimizes the restriction presented in such coolant flow, because the greater dimension of the spacer element is in the direction generally parallel with the axes of the fuel pins. Since the various elements of the spacer structure are fabricated from flat plate stock and bent to particular angles, the fabrication cost is minimized.

Another significant advantage arising from the invention is the minimization of so-called hot spots on the fuel pin cladding. A large number of variables have an affect on the extent of hot spots and among these variables are:

1. Spacer-to-fuel-pin pin cladding contact heat conductance;
2. Local circumferential variations in the film heat transfer coefficient in the vicinity of the spacer-to-fuel-pin contact;
3. Spacer material thickness and thermal conductivity;
4. The effects of axial conduction on heat in the spacer structure and the fuel rod;
5. The linear heat output of the fuel rod;
6. Axial variations in film coefficient due to spacer induced flow field perturbation;
7. Spacer length.

With respect to the above variables, one of the most significant variables is the net effective spacer-to-fuel-pin cladding contact heat conductance. In the design of the invention, the actual contact area is minimal, exposing a maximum amount of pin surface to the coolant. For certain effects, the technique of surface roughening may be employed to increase the heat conduction in the contact area and thereby further enhance cooling. The actual nature of the heat conduction under some circumstances is highly complex, being a combination of both contact transfer and convection through the spaces where the parts are not in contact due to roughening.

A second highly significant parameter is the local circumferential variation in film coefficient in the immediate vicinity of the spacer-element contact due to the shrouding effect of the spacer itself. The shrouding effect of the spacer is that effect resulting from the deflection of the flowing coolant away from the surface of the fuel pin in the region of spacer-element contact. The particular configuration of the spacer structure of the invention places a minimum of material adjacent the contact region and thereby minimizes the amount of fluid coolant deflection at such region.

The third variable listed above, that of spacer material thickness and thermal conductivity, depends upon the particular structural requirements. A material should be selected to be relatively thin to minimize coolant pressure drop and should have the maximum thermal conductivity within the structurally feasible materials.

The fourth factor, the effects of axial conduction, are minimal in grid type spacers such as is the general nature of the structure of the invention. The same is true of the fifth factor listed above.

In view of the fact that the spacer structure of the invention presents minimum frontal area to the coolant flow and minimizes the amount of material closely adjacent the fuel pin surface, perturbation of the coolant flow, both generally and near the region of contact, is minimized. As a result, axial variations in the film coefficient due to perturbations of the coolant flow field are minimized.

The seventh factor above, spacer length, is typically insignificant in spacer structures designed in accordance with the invention. This is probably due to the inherent nature of the grid type spacer in which axial conduction effects are minimal.

To summarize the advantages of the invention, the size of the affected zone on the surface of the fuel pin which is affected by local heat transfer variation, and which is generally proportional to the hot spot which could develop, is minimized for the spacer structure of the invention. Another advantage of the invention is that of the flexibility provided, since the spacer structure of the invention is not restricted to particular pin pitch-to-diameter diameter ratios. When using a triangular pin pitch, such as is common in the art, there is a limit on pitch-to-diameter ratio at which one cannot get a straight path between the fuel pins. As a result of this limit, the pitch-to-diameter ratio of the spacer in a triangular pin pitch arrangement is typically limited to not less than 1.155. In the spacer structure of the invention, the pitch-to-diameter ratio can be significantly less, and can even approach 1, the limit, of course, being governed by the thickness of the metal from which the parts are fabricated.

A further advantage of the invention is, as previously stated, the minimal cost of manufacture. In addition, the particular spacer structure of the invention readily accommodates fuel pin twisting due to thermal distortion or tortional vibration with no diminution in the functionality of the spacer structure. The flexible nature of the spacer also takes into account some tolerance variation and may aid in damping flow induced vibrations.

Referring now to FIGS. 5 and 6, an alternative embodiment of the invention is illustrated. The arrangement of FIG. 6 provides six points of contact for each fuel pin rather than three as in the previously described embodiment. Referring to FIG. 5, a single spacer element 56 is illustrated comprising a central flat strip section 57 and a pair of contact sections 58, one on each end of the strip 57. The contact sections 58 are identical with the contact sections 13 shown and described in connection with the previous embodiment, and interlock with the corresponding contact sections of immediately adjacent spacer elements in the same manner as the previous embodiment. The resulting interlocking arrangement of separate spacer elements 56 may be seen in FIG. 6 in which the spacer elements are interlocked in a grid-like assembly and in which the convex surfaces provided by the contact sections 58 engage the fuel pins 59 in the manner of the previous embodiment.

Separate transition elements, not shown, are provided as in the previous embodiment at the periphery of the spacer structure engaging the inner surface of the fuel element housing. The arrangement illustrated in FIG. 6 has the advantage that the individual spacer elements 56 are easy to make and that the spacer structure itself gives greater support due to the greater number of contact regions. On the other hand, the greater surface area presented to the coolant flow is a disadvantage since more flow resistance results. Where pressure drop is not highly critical, such a structure may be of significant advantage.

As a modification of the design of the spacer element illustrated in FIG. 5, a spacer element is shown in FIG. 6 wherein only the top half of a strip 57a is formed with contact sections 58a on its ends, and wherein the bottom half 57b extends in a straight line with only a small offset section 58b. The sections 58b on adjacent spacer elements engage each other. The individual spacer elements may then be secured to each other by brazing at the engaged sections 58b of the lower parts 57b, while the contact sections are left unbrazed for greater flexibility. The other embodiments described herein may be modified in a similar manner.

Referring now to FIGS. 8 and 9, a further alternative embodiment of the invention is illustrated. The embodiment of FIGS. 8 and 9 is similar to that of FIGS. 5 and 6 in the provision of a strip-like spacer element 66 having a pair of contact sections 67, one at each end. each end. The contact sections of the spacer element 66, however, are of substantially semi-cylindrical shape rather than the angular shape of the embodiment of FIGS. 5 and 6. Accordingly, a slightly greater amount of frontal area is presented to the flow of coolant and a slightly greater amount of material is in the region of contact between the spacer element and the adjacent fuel pin. In some instances however, such increases may be within the tolerable limits. To allow for variation in the radii of the contact sections, it may be desirable to provide a bushing or ferrule 68 (FIG. 9) in the region where the contact sections 67 interlock. This adds to the total amount of frontal area presented to the coolant flow but may be tolerable in some circumstances.

It may therefore be seen that the invention provides an improved spacer structure for maintaining a spaced relation between a plurality of generally parallel fuel pins in a nuclear reactor. The structure provides very little flow restriction and minimum coolant perturbation near the fuel pin, which minimizes hot spots. Since it is fabricated from flat sheet stock and bent to particular angles or radii, the fabrication cost is minimal. When utilized in a hexagonal array, the array of fuel pins is not limited to particular pitch-to-diameter ratios. The invention has particular advantage in connection with gas cooled nuclear reactors, but is applicable to nuclear reactors of all types utilizing elongated fuel pins or fuel rods, with or without modular construction.

Various modifications of the invention in addition to those shown and described herein will become apparent to those skilled in the art from the foregoing description and accompanying drawings. Such modifications are intended to fall within the scope of the appended claims.

What is claimed is:

1. A spacer structure for maintaining a spaced relation between a plurality of generally parallel fuel pins within a housing in a nuclear reactor, comprising, a plurality of spacer elements with the housing having a lateral cross section substantially larger than the size of a single one of said spacer elements, said each of said spacer elements being formed with at least two contact sections having convex surfaces thereon, each convex surface protruding toward a respective adjacent fuel pin for engaging same, at least part of said contact sections of said spacer elements being formed in an interlockable configuration to interlock with the corresponding contact sections of immediately adjacent spacer elements and being so interlocked in an interlocked assembly, each interlocked assembly having three extending planar strips, wherein one of said contact sections is at the end of each strip, and wherein said spacer elements are arranged in a grid structure with each interlocked assembly being engaged at three of said contact sections by different fuel pins said spacer elements being formed with substantially greater dimension in the direction generally parallel with the axes of the fuel pins than in the direction transverse thereto to present, for a given cross sectional area of said spacer elements, minimal resistance to coolant flow along the fuel pins.

2. A spacer structure according to claim 1 wherein each spacer element is of elongated shape, wherein one of said contact sections is at each end thereof, and wherein said spacer elements are arranged in said grid-like assembly having a plurality of openings for receiving fuel pins, said spacer elements being arranged with six of said convex surfaces projecting into each of said openings.

3. A spacer structure according to claim 1 wherein each spacer element is comprised of sheet metal, and wherein each of said contact sections comprises a transverse formed protrusion in the sheet.

4. A spacer structure according to claim 4 wherein each of said contact sections includes a pair of oblique planar segments.

5. A spacer structure according to claim 4 wherein each of said contact sections includes a substantially semi-cylindrical segment.

6. A spacer structure according to claim 1 wherein each spacer element is fabricated out of plate metal with three extending strips of plate metal each of which is offset from the other two strips a distance in the direction generally parallel with the axes of the fuel pins, said spacer elements being arranged in said grid-like assembly with the legs of corresponding displacement at corresponding levels.

* * * * *